Figures 2, 5:
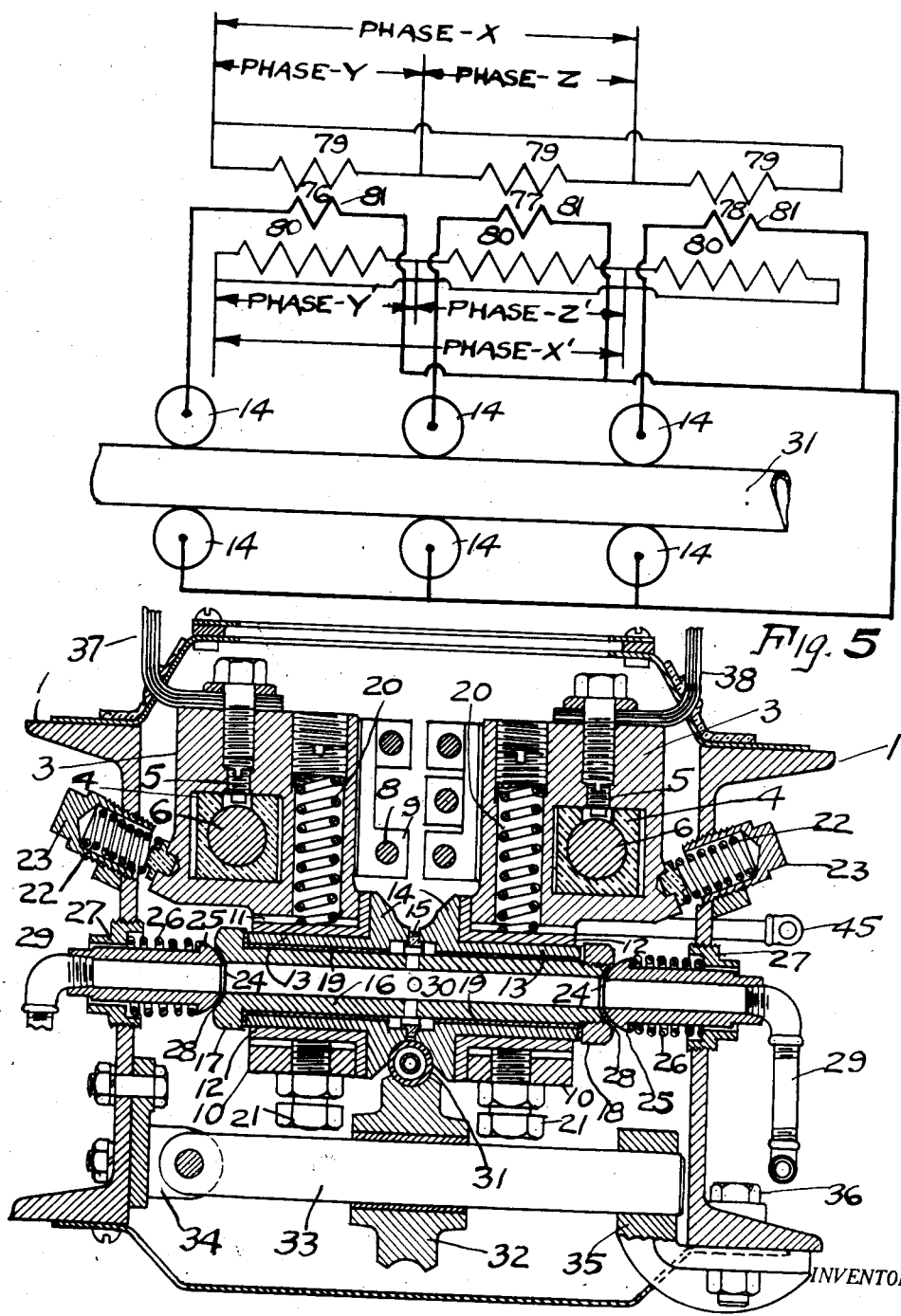

Sept. 7, 1937.  C. N. MITCHELL  2,092,003
ALTERNATING CURRENT WELDING APPARATUS
Original Filed Nov. 24, 1930   3 Sheets-Sheet 1
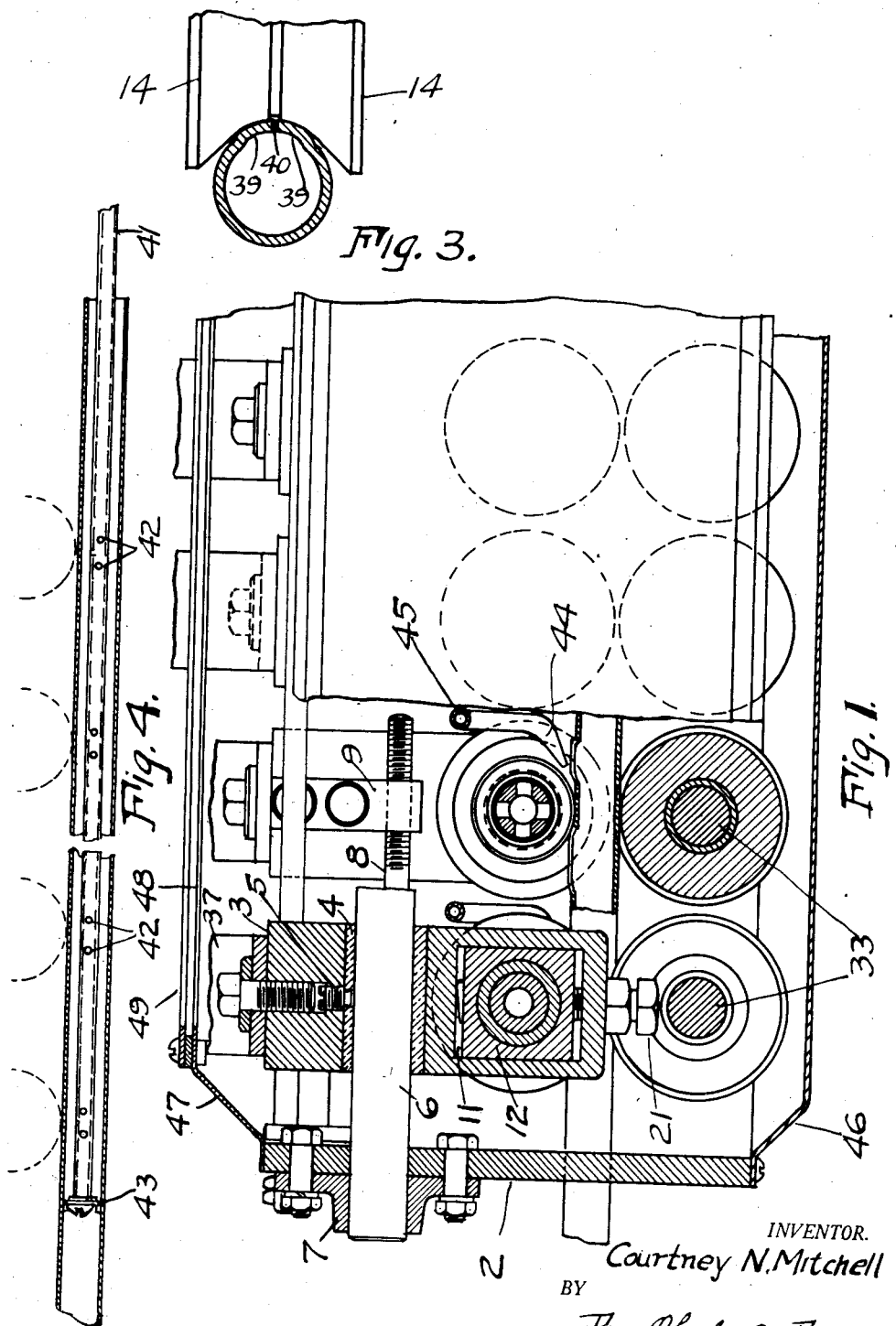
INVENTOR.
Courtney N. Mitchell
BY
Fay, Oberlin & Fay
ATTORNEYS Sept. 7, 1937.  C. N. MITCHELL  2,092,003
ALTERNATING CURRENT WELDING APPARATUS
Original Filed Nov. 24, 1930   3 Sheets-Sheet 2

INVENTOR.
BY Courtney N. Mitchell
Fay, Oberlin & Fay
ATTORNEYS

Patented Sept. 7, 1937

2,092,003

UNITED STATES PATENT OFFICE 2,092,003

ALTERNATING CURRENT WELDING APPARATUS

Courtney N. Mitchell, Strongsville, Ohio

Application November 24, 1930, Serial No. 497,627
Renewed May 29, 1936

29 Claims. (Cl. 219—6)

This invention, relating as indicated, to a method of and apparatus for electric welding by means of alternating current is in part a continuation of application Serial No. 430,694 filed Feb. 24, 1930, in that the general arrangement of the apparatus disclosed in the aforesaid application is employed in carrying out the principles of this invention, changes being made only in the specific features comprising the novel elements of this method and design. As will be noted from a careful examination of the apparatus disclosed in the aforesaid co-pending application, such apparatus is designed primarily for the purpose of welding tubing and the like having a relatively thin shell or wall, so that the contiguous edges of the seam to be welded are of relatively thin material. One of the objects of this invention is to provide an apparatus which may be efficiently employed for the purpose of welding material which is much thicker than any capable of being handled by the apparatus disclosed in said application.

In the welding of tubing and like material at a relatively high speed considerable difficulty has been experienced in the past in maintaining the proper contact between the welding electrode and the edges of the seam to be joined. This difficulty has been due primarily to the fact that as the metal along the seam to be welded is heated sufficiently to properly weld, the pressure necessarily exerted on such material to effect the weld by means of the contacting electrodes or rollers has been sufficient to deform such material and further, due to the fact that such material may be deformed unevenly, the electrode will upon relative movement of the article to be welded have only superficial contact with portions of the tube or like articles. It is among the objects of this invention to provide a method and apparatus which shall obviate this undesirable characteristic of welding apparatus and methods as heretofore employed.

As is well known to those familiar with the art of electric welding, one of the main sources of deterioration of the material forming the weld joining the two elements sought to be united, has been the oxidation of the highly heated metal, which oxidation will prevent the formation of a homogeneous weld structure, and a consequent weakness thereof. A further source of deterioration of the resultant weld has been due to the combination of atmospheric nitrogen with the molten or highly heated metal to form objectionable iron nitrides which have the same deleterious effect as the oxides formed by the combination of the oxygen with the heated metal. It is among the objects of my invention to provide a method and apparatus for alternating current electric welding which will produce a finished weld seam having none of the hereinbefore described structural weaknesses.

As is well known to those familiar with the art of alternating current electric welding the individual welds across the seam cleft are produced by the successive impulses, both positive and negative, of the alternating current. The employment of alternating current for the purposes of welding in the fashion described in the aforesaid co-pending application results in an infinite number of separate welds usually referred to as stitches, which, by employing the apparatus comprising my invention are so related as to be contiguous or overlapping so that a continuous weld results. When alternating current is employed for welding purposes, one of the objectionable features of its use has been that the maximum of the impulse necessary to produce the weld has been excessive to the point where an overheating and consequent deterioration of the metal has resulted. This will be more readily understood by having reference to the common sine wave form of alternating current usually employed wherein the positive and negative impulses of current occur in relatively sharp peaks. This common sine wave form of alternating current has caused a burning of the metal without a sufficient duration of the welding current impulse to form a weld or stitch of appreciable length. It is among the objects of my invention to provide a method of electric welding by alternating current which shall have none of these undesirable characteristics. Other objects of my invention will appear as the description proceeds.

To the accomplishment of the foregoing and related ends, said invention then, consists of the means hereinafter fully described and particularly pointed out in the claims. The annexed drawings and the following description setting forth in detail certain mechanism embodying the invention, such disclosed means constituting however, but one of the various mechanical forms in which the principle of the invention may be used.

Figure 6:
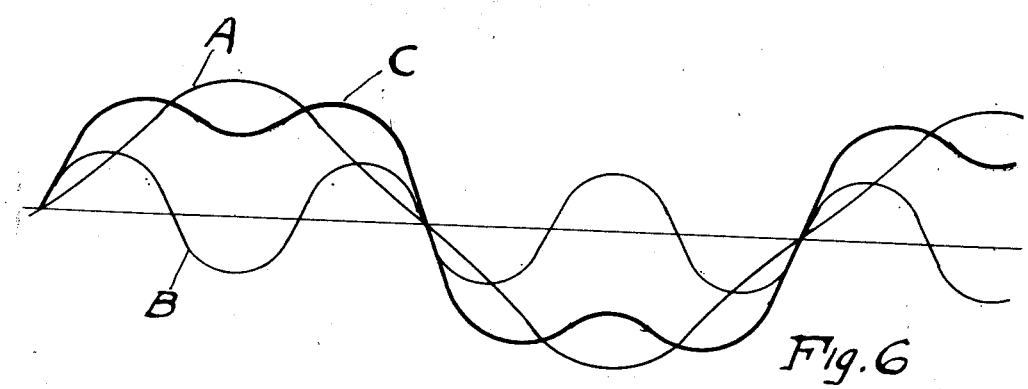
Figure 7:
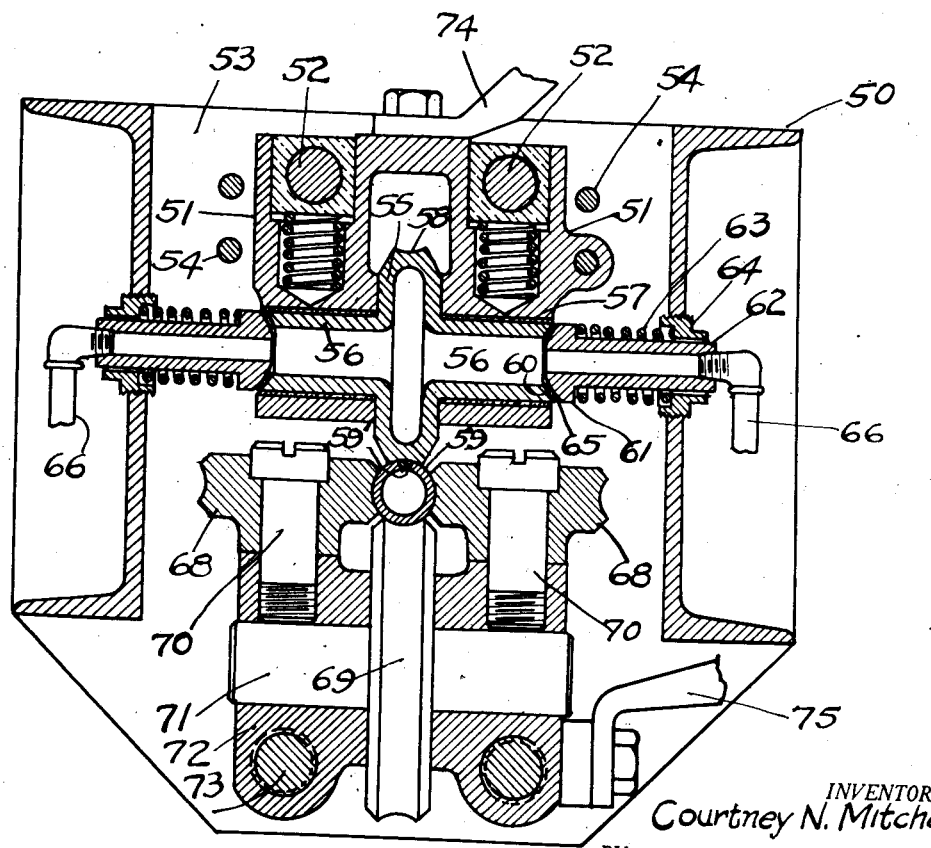

In said annexed drawings:

Fig. 1 is a part sectional, part side elevational view of one form of the apparatus comprising my invention; Fig. 2 is a transverse sectional view of the apparatus illustrated in Fig. 1; Fig. 3 is a fragmentary, part sectional, part elevational view of the welding electrodes and the tube to be welded thereby prior to the occurrence of the welding current impulse across such electrode; Fig. 4 is a broken, fragmentary, part sectional, part elevational view of the tube to be welded and a portion of the associated mechanism for accomplishing the welding operation; Fig. 5 is a wiring diagram of the circuits designed to supply the welding current to the apparatus illustrated in the previous figures; Fig. 6 is a diagrammatic representation of the welding current and the separate currents of different frequencies employed to produce the resultant welding current; and Fig. 7 is a transverse sectional view of an apparatus similar to that illustrated in the previous figures, but designed for the purpose of accomplishing the welding operation by the incorporation of a filler element of suitable material in the welded seam.

Referring more specifically to the drawings, and more especially to Figs. 1 and 2, the apparatus here illustrated, it will be noted, is similar to that illustrated and described in the aforesaid copending application, and consists of side frame members 1 which extend longitudinally of the apparatus and are cross braced at their ends by web members such as 2 to confine and support the welding apparatus presently to be described. Situated within the frame comprising the side members 1 and the end frame members 2 are a plurality of separate welding units, each of which is designed to produce a separate weld of the contiguous edges of the seam cleft in the tube or like article passing therethrough, so that by a proper arrangement of such separate welding units and a correlation of the relative positions of such units with the speed of the tube or like article passed therethrough, the individual units may be crossed to occupy contiguous or slightly overlapping relations.

Each of the above referred to separate welding units consists of electrode holder blocks 3 which have apertures extending transversely therethrough adapted to receive blocks of insulating material 4 which are secured in such apertures by dowel pins 5. The blocks of insulating material 4 are centrally apertured to receive supporting rods or bars 6 which are terminally anchored in brackets 7 secured to the end frame members 2. The bars 6 therefore support the electrode holder blocks 3 intermediately of the side frame members 1. The electrode holder blocks 3 are maintained in proper adjusting relationship axially of the supporting rods 6 by adjusting rods such as 8 which threadably engage supporting bracket members 9 respectively secured to but insulated from such welding electrode supporting blocks 3. One bracket such as 9 and one adjusting rod such as 8 are required for each set of blocks such as 3, and with the rods 9 secured to the end members 2 each individual welding unit may be properly adjusted relative to the others for the purposes hereinbefore explained. Each of the blocks 3 is provided with a depending portion 10 formed integrally therewith and provided with a substantially rectangular aperture 11 in which is positioned a bearing block 12. The bearing blocks 12 have journaled therein the necks 13 of electrode rollers 14. The electrode rollers 14 have positioned intermediately thereof a spacing member 15 of insulating material, and such rollers and their associated necks are maintained in proper assembled relation by a tubular member 16 provided with a circumferential shoulder 17 at one end, and at the other end with a threadably engaged nut 18 which is employed for the purpose of maintaining the rollers in proper assembled relation on the tubular member 16. The electrode rollers 14 and the tubular member 16 are insulated by means of sleeves 19 which are likewise provided with circumferential flanges on the terminals thereof to prevent contact between the flange 17, the nut 18 and the hub 13 of the rollers 14.

The bearing blocks 12 and consequently the electrode rollers 14 supported thereby are resiliently maintained in contact with the bottom of the aperture 11 in which such bearing blocks are mounted by means of compression springs 20 suitably mounted in the blocks 3. The bearing blocks 12 may be adjusted vertically in the aperture 11 in which the same are mounted against the resilient action of the springs 20 by means of adjusting screws 21 for the purposes hereinafter more fully explained. The blocks 3 are resiliently maintained in intimate contact with the electrode rollers 14 by means of compression springs 22 supported in the side frame members 1 by means of tubular screw elements 23.

The terminals of the tubular members 16 are provided with spherical seats 24 which engage the complementary seats formed on the ends of fluid supply conduits 25 resiliently supported in the side frame members 1 by means of springs 26 and tubular screw caps 27. Suitable members of insulating material such as 28 are interposed between the ends of the tubular member 16 and the members 25 so that the electrode holders 14 will be properly insulated from each other in order to carry out the welding operation. Fluid conduits such as 29 are provided with members 25 so that a suitable cooling fluid may be caused to circulate through the tubular member 16 and through the radially extending apertures 30 into the space defined by the annular recesses formed on the juxtaposed faces of the electrode rollers 14.

The tube or like element 31 is supported in proper relation to the welding electrode rollers 14 by means of a backing roller 32 which is rotatably mounted on a shaft 33. The shaft 33 is supported at one end by a hinged bracket 34 secured to one of the side frame members 1 and such shaft is supported at its other end by a bracket 35 removably secured to the other of such side frame members by means of a bolt 36. This form of mounting for the roller 32 permits such roller to be replaced by another of a different diameter as the same becomes worn or due to the requirement of a different size roller for backing up a different size of pipe to be welded, by simply removing the bolt 36 and moving the shaft 33 in a clock-wise direction about its point of pivotal support in the hinged bracket 34 until the roller 32 can be moved axially from the shaft. Welding current for the electrode rollers 14 is supplied through leads 37 and 38 respectively secured to the blocks 3 supporting such rollers and also connected to opposite sides of the line forming the source of welding current supply hereinafter more fully explained.

As indicated at the outset of this description, as the tube or like article is caused to move through the welding apparatus the successive welds made therein by the separate welding units may cause depressions in the surface of the tube so that poor contact will be had by the welding electrodes unless some means is provided to insure positive contact. As most clearly illustrated in Fig. 3 the tube, preliminary to the welding operation is formed with a contour not truly symmetrical but end portions 39 adjacent the seam to be welded displaced radially for a short distance, so that as the electrode rollers 14 pass thereover under the influence of the compression springs 20, the heat generated by the impulse of welding current flowing across the seam 40 will heat the metal in the portion 39 sufficiently so that the springs 20 will cause the roller 14 to form the tube into truly cylindrical cross section.

In order to obviate the occurrence of an inferior weld resulting from the combination of the heated metal with the atmospheric oxygen or nitrogen as hereinbefore described, I propose to provide a blanket of inert gas around the welding area so as to exclude all atmospheric oxygen and nitrogen. This is accomplished as most clearly illustrated in Figs. 1 and 4 by providing a tubular member such as 41 extending axially into the tube to be welded and provided with a plurality of egress apertures 42 positioned directly beneath the electrode rollers 14 so that the inner surface of the pipe or tube in the welding area will be suitably blanketed by such inert gas supplied by the tube 41. In order to prevent the escape of the gas from the tube, and further to increase the efficiency of the apparatus a gasket member such as 43 may be applied to the end of such tube to prevent the escape of inert gas at this point. Likewise, the blanket of inert gas may be supplied to the exterior of the tube in the areas to be welded by nozzle members such as 44 supplied with the inert gas used for the above described purposes by conduit members such as 45, the nozzles 44 being directed to the welding area directly beneath the electrode rollers 14. In order to prevent the use of unnecessary quantities of such inert gas, and further, to generally increase the efficiency of the apparatus comprising my invention, I may provide cross members such as 46 and 47 respectively closing the bottom and top of the space laterally confined by the side and end frame members 1 and 2. In order to facilitate the observation of the welding operation, the cover member 47 across the top of the apparatus may be provided with an aperture 48 closed by a transparent cover member 49.

It will be noted that the above described apparatus is primarily designed to be employed for the purpose of welding tubing wherein a simple so-called butt weld is effected. If, as is sometimes desirable for certain classes of work, it should be desirable to supply a strip or filler element of foreign material such as a wire to the seam to be welded, the apparatus to accomplish this result is most clearly illustrated in Fig. 7. The general form of this apparatus is similar to that described in the previous figures, and here again, consists of side frame members 50, intermediately of which are supported in proper relation electrode supporting blocks 51 provided with recesses for blocks of insulating material which receive supporting rods 52 which are anchored at their ends in the members 53 extending transversely of the side frame members. The plurality of separate welding units are in this form of construction supporting in proper spaced relation axially of the supporting rods 52 by rods 54 which are similar in their operations and mounting to the rods 8 as described in connection with the previous figures. The electrode supporting blocks 51 have journaled therein electrode rollers 55 which are provided with axially extending necks 56 rotatably supported in sleeves of insulating material 57 carried by the blocks 51. The electrode roller 55 is provided with a spherical circumferential groove 58 which will contact with the outer periphery of the tube 59 to be welded. The tubular necks 56 of the electrode rollers 55 are terminally provided with spherical seats 60 engaged by the complementary terminals 61 of fluid supply members 62 which are resiliently maintained in contact with the terminals of the necks 56 by means of springs 63 and screw cups 64 secured in the side frame members 50. Elements of insulating material 65 are interposed between the juxtaposed terminals 60 and 61, so that no welding current may stray in this direction. The cooling fluid for the electrode rollers 55 is supplied by means of conduit such as 66 secured to the ends of the members 62. The tube to be welded is supported by means of rollers 68 and 69, the former being mounted on stub shafts 70 and the latter on a shaft 71, all of such shafts being carried by a block 72 secured to the end frame members 53 by shafts 73. One lead 74 for the welding current is secured to the block 51 supporting the electrode rollers 55 and the other lead 75 is secured to the block 72 supporting the backing rollers 68 and 69. The seam cleft in the tube 59 to be welded is, as above indicated, supplied with a strip 59' of metal which will be interposed between the edges of such seam so that as the welding of the same progresses the wire or like material 59' will be heated by the current flow therethrough, which, when brought into intimate contact with the similarly heated edges of the seam cleft of the pressure of the springs maintaining contact between the roller 55 and the tube, the parts will be welded together. As indicated at the outset of this description, instead of employing regular sine wave alternating current in connection with the method and apparatus comprising this invention, I propose to employ a current of modified wave form such as is illustrated by the line C in Fig. 6. By superimposing a high and low frequency such as is illustrated by the lines A and B in Fig. 6 on the welding current circuit the resultant welding current will have the form illustrated by the curve C. Assuming that the high frequency current is 60 cycle current and the low frequency is 20 cycle current, by a proper regulation of the magnitude of each of such currents, the form of the resultant current wave cycle may be controlled. This form of welding current, as illustrated by the wave line C eliminates the objectionable peak of the regular sine wave form of current, which peak, in order to produce a stitch or weld of appreciable length would cause sufficient current to flow across the seam cleft to heat the metal to such a point that deterioration thereof would occur. It will be noted in connection with the current wave diagram as illustrated in Fig. 6 that the wave line C may be so regulated that any desired contour thereof may be had to adapt the same to the particular requirements of the material to be welded. One of the means for producing the modified welding current wave illustrated in Fig. 6 is shown by the wiring diagram in Fig. 5. In this figure the transformers 76, 77 and 78 are each provided with superimposed primary windings 79 and 80 which are respectively secured across the three-phases, i. e. X, Y, and Z of a high frequency line, and X', Y' and Z' of a low frequency line. The secondary windings 81 of the transformers 76, 77 and 78 are in turn connected across the electrode rollers 14 which contact with the tube 31 to be welded along opposite sides of the seam. It will be noted that a different arrangement than that illustrated in this figure may be employed for the purpose of producing the modified wave cycle to the welding current and also that a greater number of transformers may be employed in order to supply the welding current to more than the three illustrated pairs of welding electrodes. It is believed that the advantages of this modified wave form of alternating welding current has further advantages so apparent to those familiar with the art that a repetition of this is unnecessary.

Other modes of applying the principle of my invention may be employed instead of the one explained, change being made as regards the mechanism herein disclosed, provided the means stated by any of the following claims or the equivalent of such stated means be employed.

I therefore particularly point out and directly claim as my invention:

1. In apparatus for electric welding, the combination of a plurality of paired electrodes contacting with opposite edges of the seam to be welded, means for introducing an inert fluid to the area being welded, said last named means comprising a nozzle directed into the area of the weld, an enclosure structure adapted to retain the aforesaid inert fluid, a pair of bars extending through said enclosure and supporting said electrodes, means for moving said electrodes along said bars, and means for advancing said seam relative the said electrodes.

2. In apparatus for electric welding tubing the combination of a plurality of paired electrodes adapted to contact with the opposite edges of the seam to be welded, a conduit extending into said tube for discharging an inert fluid into said tube in the vicinity of the areas being welded, an enclosure structure surrounding a portion of said tube, a pair of bars extending through said enclosure and supporting said electrodes, means for moving said electrodes axially of said tube, and means for advancing said tube relative said electrodes.

3. In apparatus for electric welding, the combination of a plurality of paired electrodes, said electrodes comprising rollers for directing welding current flow across the seam to be welded at successive points, means associated with said rollers for supporting the work to be welded, means for advancing said seam relative said electrodes supporting bars substantially parallel with the seam, a supporting means interposed between said bars and said rollers, means maintaining said rollers in contact with the work, a support for said last named means, and means for adjusting the position of said support longitudinally the seam to be welded.

4. In apparatus for electric welding, the combination of a plurality of paired electrodes, said electrodes comprising rollers for directing welding current flow across the seam to be welded at successive points, means associated with said rollers for supporting the work to be welded, supporting bars substantially parallel with the seam, a supporting means interposed between said bars and said rollers, resilient means maintaining said rollers in contact with the work, and means for adjusting the position of the aforesaid rollers.

5. Apparatus for electric welding comprising a frame, a plurality of spaced pairs of electrodes supported by said frame and adapted to contact opposite sides of a seam to be welded, and supporting bars having their axes substantially parallel with said seam, sliding means interposed between said bars and said electrodes, means for independently adjusting the position of each pair of electrodes along said seam, said last named means comprising a screw extending longitudinally the seam to be welded, a nut member and an axially constrained member engaging said screw, and one of the last named members associated with the electrode adjusted by said screw and the other of said members carried by the aforesaid frame.

6. Apparatus for electric welding comprising a frame, means for movably supporting the material to be welded, a plurality of spaced pairs of electrodes supported by said frame and adapted to contact opposite sides of the seam of the material to be welded, supporting bars having their axes substantially parallel with said seam, sliding means interposed between said bars and said electrodes, and means for independently adjusting the position of each pair of electrodes along said seam, said last named means comprising a screw extending longitudinally the seam to be welded, a nut member and an axially constrained member engaging said screw, and one of the last named members associated with the electrode adjusted by said screw and the other of said members carried by the aforesaid frame.

7. Apparatus for electric welding comprising a frame, means for movably supporting the material to be welded, a plurality of spaced pairs of electrodes supported by said frame and adapted to contact opposite sides of the seam of the material to be welded, said frame including a pair of supporting bars having their axes substantially parallel with said seam, sliding means interposed between said bars and said electrodes, means for independently adjusting the position of each pair of electrodes along said seam, tension means for maintaining the electrodes in contact with said material, said tension means comprising a plurality of resilient members acting substantially at right angles to each other.

8. Apparatus for electric welding comprising a frame, means for movably supporting the material to be welded, a plurality of spaced pairs of electrodes supported by said frame and in contact with opposite sides of the seam of the material to be welded, and means for circulating a cooling fluid axially through each pair of electrodes, said means comprising a hollow shaft, a conduit member engaging said hollow shaft, and spring means for holding said conduit member in sealed relationship with said shaft.

9. Apparatus for electric welding comprising a frame, means for movably supporting the material to be welded, a plurality of spaced pairs of electrodes supported by said frame and in contact with opposite sides of the seam of said material, a hollow conduit extending axially through each pair of electrodes, and means for circulating a cooling fluid through said conduit, said means comprising a hollow electrode, a conduit member in communication with said hollow electrode, said conduit member having a self aligning seat, and means for maintaining said seat in contact with an associated part.

10. Apparatus for electric welding comprising a frame, means for movably supporting the material to be welded, a plurality of spaced pairs of electrodes supported by said frame and in contact with opposite sides of the seam of said material, a hollow conduit extending axially through each pair of electrodes and having apertures therein in proximity to the opposed faces of each pair of electrodes, and means for circulating a cooling fluid through said conduit, and out of said apertures.

11. In apparatus for electric welding, the combination of a plurality of paired electrodes, said electrodes comprising rollers for directing welding current flow across the seam to be welded at successive points, a supporting bar for said electrodes, universal means interposed between said bar and said rollers for permitting movement of said rollers in two directions transversely of said seam, the two directions being substantially at right angles to each other, means associated with said rollers for supporting the work to be welded, and resilient means maintaining said rollers in contact with the work, said resilient means comprising a plurality of spring members associated with each electrode.

12. In apparatus for electric welding, the combination of paired electrodes contacting with opposite edges of the seam to be welded, means for introducing a fluid to the area to be welded, said means comprising a conduit adapted to direct the fluid into the region of the weld, an enclosure structure surrounding the region of discharge of said fluid, a frame for the aforesaid apparatus comprising walls for the enclosure, bars extending through said enclosure, said bars being supported by said frame, and means for attaching the aforesaid electrodes to said bars.

13. In apparatus for electric welding, the combination of paired electrodes contacting with opposite edges of the seam to be welded, means for introducing fluid to the edges to be welded, an enclosure structure surrounding said electrodes and a part of the seam, said enclosure structure adapted to retain the said fluid, bars extending through said enclosure, said bars being supported by a frame, means for attaching the aforesaid electrodes to said bars, and means connecting said electrodes and said frame whereby the position of said electrodes may be adjusted.

14. In apparatus for electric welding, the combination of paired electrodes contacting with opposite edges of the seam to be welded, means for introducing fluid to the edges of said seam, an enclosure structure surrounding said electrodes and a part of the seam, bars extending through the space within the enclosure structure, said bars being supported by a frame, means for adjustably attaching the aforesaid electrodes to said bars, and a means for inspecting the interior of said enclosure structure while the said apparatus is in operation.

15. In apparatus for electric welding, a frame, supporting bars carried by said frame, said bars extending longitudinally the seam to be welded, paired electrodes contacting with the material to be welded, said electrodes supported by said bars, insulating members interposed between said electrodes and said bars, said insulating members adapted to move axially of said bars, and means adapted to adjust the position of said electrodes on said bars.

16. In apparatus for electric welding, a frame, supporting bars carried by said frame, said bars extending longitudinally the seam to be welded, paired electrodes contacting with the material to be welded, said electrodes supported by said bars, insulating members interposed between said electrodes and with said bars, resilient means adapted to maintain contact between said electrodes and said material to be welded, and means adapted to adjust the position of said electrodes on said bars.

17. In apparatus for electric welding, a frame, paired electrodes supported in said frame, and means for supporting the material to be welded in contact with said electrodes, said means comprising a roller replacably assembled on a hingedly supported shaft.

18. In a device of the character described, a frame having sides made of structural shapes, a transverse plate joining the corresponding ends of said sides, supporting bars extending substantially parallel with said sides, electrodes adjustably mounted on said bars, means for adjusting the position of said electrodes axially of said bars, and means for bringing into welding relationship with said electrodes a seam to be welded.

19. In a device of the character described, a frame having substantially parallel side members, transverse members joining said side members and therewith forming an enclosure, supporting bars extending substantially through said enclosure, said bars supporting pairs of electrodes, means adapted to adjust the position of said electrodes on said bars, and means for bringing the material to be welded into welding relationship with said electrodes.

20. In a device of the character described, a pair of fixed supporting bars extending longitudinally in a frame, blocks slidably carried on said bars, electrode members supported by said blocks, means for adjusting the electrode members relative to said bars, and means for advancing relative to said electrode members a seam to be welded.

21. In apparatus for welding elongated adjoining parts, a sealed enclosure adapted to retain a predetermined atmosphere, supporting members extending into said enclosure, heating elements within said enclosure, said heating elements being carried by said supporting members, means independent of the supporting members for adjusting the position of said heating members on said supporting members, and means for supplying heating energy to said heating members, said last named means being sealed at its point of entrance to the enclosure to prevent a loss of the predetermined atmosphere.

22. In apparatus for welding adjoining parts of a substantially cylindrical article, a sealed enclosure adapted to retain a predetermined atmosphere, a supporting member extending into said enclosure, an electric conducting member embracing a part of said cylindrical article and being carried by said supporting member, said conducting member being contained within said enclosure, means extending into said enclosure for supplying heating current to said conducting member, and means associated with said last named means to prevent a loss of the predetermined atmosphere.

23. In apparatus for the fusion of abutting surfaces of a metal article, a pair of current conducting members embracing parts of the article, an enclosure surrounding the parts, a predetermined controlled atmosphere within said enclosure and surrounding said surfaces, adjusting means for regulating the position of said current conducting members, said adjusting means extending through a wall of the enclosure, and means for supplying heating current to the aforesaid current conducting members.

24. In apparatus for welding an article, an enclosure surrounding a part of said article and adapted to retain a predetermined atmosphere, means for bringing a surface of said article into contacting relationship with another surface, an electric conducting member embracing a part of said article, current carrying means for supplying current to said conducting member, said current carrying means extending through a wall of the enclosure, and means for preventing a leakage of the predetermined atmosphere at said wall.

25. In apparatus for welding an article, an enclosure surrounding a part of said article and adapted to retain a predetermined atmosphere, resilient means for bringing a surface of said article into welding relationship with another surface, an electric conducting member embracing a part of said article, and a current carrying means for supplying current to said conducting member, said current carrying means extending through a wall of the enclosure.

26. In apparatus for welding an article, an enclosure surrounding a part of said article and adapted to retain a predetermined atmosphere, means for bringing a surface of said article into contacting relationship with another surface, a multiplicity of current conducting members within said enclosure, supporting means for said current conducting members, said supporting means extending into the said enclosure, and means for adjusting said current conducting members on said supporting means, said adjusting means extending through a wall of the aforesaid enclosure.

27. In apparatus for welding an article, an enclosure surrounding a part of said article and adapted to retain a predetermined atmosphere, means for bringing a surface of said article into contacting relationship with another surface, a current conducting member embracing a part of said article, current carrying means for supplying current to said conducting member, said current carrying means extending through a wall of the enclosure, and means for simultaneously delivering into said enclosure two sources of fluid comprising the aforesaid predetermined atmosphere.

28. In apparatus for welding an article, an enclosure surrounding a part of said article and adapted to retain a predetermined atmosphere, means for bringing a surface of said article into contacting relationship with another surface, a current conducting member embracing a part of said article, current carrying means for supplying current to said conducting member, said current carrying means extending through a wall of the enclosure, and means for simultaneously delivering to the region of welding two sources of fluid comprising the aforesaid controlled atmosphere.

29. In apparatus for welding an article, an enclosure surrounding a part of said article and adapted to retain a predetermined atmosphere, means for bringing a surface of said article into contacting relationship with another surface, a multiplicity of current conducting members embracing parts of said article, current carrying means for supplying current to said conducting members, means for progressively moving the article relative to said current conducting members, and means for bringing the surfaces into welding relationship.

COURTNEY N. MITCHELL.